(12) United States Patent
Wei et al.

(10) Patent No.: US 11,758,887 B1
(45) Date of Patent: Sep. 19, 2023

(54) METHOD, SYSTEM AND APPARATUS FOR INTELLIGENTLY MONITORING AQUAFARM WITH MULTI-DIMENSIONAL PANORAMIC PERCEPTION

(71) Applicant: China Agricultural University, Beijing (CN)

(72) Inventors: Yaoguang Wei, Beijing (CN); Dong An, Beijing (CN); Daoliang Li, Beijing (CN); Bingqian Zhou, Beijing (CN); Jincun Liu, Beijing (CN)

(73) Assignee: China Agricultural University, Beijing (CN)

( * ) Notice: Subject to any disclaimer, the term of this patent is extended or adjusted under 35 U.S.C. 154(b) by 0 days.

(21) Appl. No.: 18/303,341

(22) Filed: Apr. 19, 2023

(30) Foreign Application Priority Data

Aug. 10, 2022 (CN) .......................... 202210952683.5

(51) Int. Cl.
*A01K 63/04* (2006.01)
*G06Q 10/04* (2023.01)
*G06Q 50/02* (2012.01)
*G01D 21/02* (2006.01)

(52) U.S. Cl.
CPC ............ *A01K 63/04* (2013.01); *G01D 21/02* (2013.01); *G06Q 10/04* (2013.01); *G06Q 50/02* (2013.01)

(58) Field of Classification Search
CPC ........ A01K 63/04; G01D 21/02; G06Q 10/04; G06Q 50/02
USPC ........................................................ 702/189
See application file for complete search history.

(56) References Cited

U.S. PATENT DOCUMENTS

2017/0192124 A1 7/2017 Kolar et al.
2019/0230913 A1 8/2019 Chen et al.

FOREIGN PATENT DOCUMENTS

| CN | 101520449 | | 9/2009 | |
| CN | 109640032 | | 4/2019 | |
| CN | 111290349 | A * | 6/2020 | ............. G08C 17/02 |
| CN | 111356108 | A * | 6/2020 | ........... G06N 3/0454 |
| CN | 111687689 | | 9/2020 | |
| CN | 112766303 | | 5/2021 | |
| CN | 113902207 | | 1/2022 | |

(Continued)

OTHER PUBLICATIONS

Chinese Patent Application No. 202210952683.5, Office Action, dated Sep. 14, 2022, 22 pages.

(Continued)

*Primary Examiner* — John H Le
(74) *Attorney, Agent, or Firm* — DLA PIPER LLP (US)

(57) ABSTRACT

The present disclosure relates to the technical field of aquafarm monitoring, and in particular to a method, system and apparatus for intelligently monitoring an aquafarm with multi-dimensional panoramic perception. The method includes: analyzing preprocessed multi-dimensional panoramic perception information with time series analysis to obtain a linear fitting model; constructing a water quality forecasting-alarming model according to the linear fitting model; inputting fused data to a convolutional neural network (CNN) for training to obtain an electrical device fault diagnosis model; and monitoring an aquafarm with the water quality forecasting-alarming model and the electrical device fault diagnosis model.

7 Claims, 7 Drawing Sheets

(56) References Cited

FOREIGN PATENT DOCUMENTS

| | | |
|---|---|---|
| CN | 114169638 | 3/2022 |
| CN | 115014445 | 11/2022 |

OTHER PUBLICATIONS

Chinese Patent Application No. 202210952683.5, Notification to Grant Patent Right for Invention, dated Oct. 10, 2022, 3 pages.

Zhang, et al., "Offshore aquaculture platform control system in intelligent fishery era," China Academic Journal Electronic Publishing House, vol. 5 No. 4, Dec. 2021, 17 pages.

\* cited by examiner

METHOD, SYSTEM AND APPARATUS FOR INTELLIGENTLY MONITORING AQUAFARM WITH MULTI-DIMENSIONAL PANORAMIC PERCEPTION

CROSS REFERENCE TO RELATED APPLICATIONS

This application claims the benefit and priority to Chinese Patent Application No. 202210952683.5, filed Aug. 10, 2022, the content of which is incorporated herein by reference in its entirety.

TECHNICAL FIELD

The present disclosure relates to the technical field of aquafarm monitoring, and in particular to a method, system and apparatus for intelligently monitoring an aquafarm with multi-dimensional panoramic perception.

BACKGROUND

In a time of a once-in-a-century pandemic and unprecedented global changes, the fishery development is confronted with restrictions and challenges. For example, rigid constraints for resources and environments are prominent, fishery resources are depressed, and water ecological environments are degraded. For increasingly restricted spaces of conventional aquaculture and soaring production costs, comparative benefits of the fishery are coming down continuously. High-quality aquatic products are supplied at a low proportion, and aquatic products processed based on consumption habits of citizens are developed inadequately, all of which are not well suitable for diverse consumption needs on the aquatic products. Trades for aquatic products are greatly narrowed or even show a deficit. Some aquatic fingerlings need to be imported, and the capability of independent innovation is weak. The aquaculture is presented with low degrees of standardization and mechanization, a low level of supporting services, insufficient construction of environmental protection facilities for tailwater treatment, environmental protection of fishing vessels and cleaning of fishing ports, and low information, digital and intelligent levels in fishery production. With rapid improvement in people's living standard, the contradiction between a mounting demand for high-quality proteins and a growing pressure is acute. Hence, developing an intelligent and efficient aquafarm method is envisioned as an important direction to break through constraints in ecological environments and natural resources.

Conventional aquafarm scenarios have the following problems: (1) Information of electrical devices in aquafarms is acquired hardly and transmitted at a limited distance, which makes access and data transmission of the electrical devices unsecure. (2) There lacks an efficient information perception method to acquire information of aquafarm environments. The digital monitoring level for information on the water quality, atmospheric environment and electrical devices in aquafarm is low. (3) Existing aquafarms largely depends on experience. The coupling mechanism between the water quality, the atmospheric environment and the electrical devices is complicated. The intelligent control level for the electrical devices is low, the energy consumption is high, and the level of risk prevention is low. (4) For conventional aquafarm environments, a fault is diagnosed by single information in most cases. However, with a single information source, only a part of feature information of a monitored object can be acquired in device alarm detection. The feature information is inaccurate and insufficient to describe the monitored object, but can only describe some aspects of the monitored object. (5) The aquafarms are operated and maintained at a low intelligent degree, and are basically still managed under a lot of manpower. (6) Device data information of the aquafarms is mismanaged, and illegally invaded by users, which poses a certain threat to secure storage and transmission of the information.

SUMMARY

An objective of the present disclosure is to provide a method, system and apparatus for intelligently monitoring an aquafarm with multi-dimensional panoramic perception, to overcome shortages of the prior art.

To achieve the above objective, the present invention provides the following technical solutions:

The present disclosure provides a method for intelligently monitoring an aquafarm with multi-dimensional panoramic perception, including:

acquiring multi-dimensional panoramic perception information of an aquafarm with sensors, where the multi-dimensional panoramic perception information includes water quality information, atmospheric environmental information, and electrical device state information in the aquafarm; the water quality information includes an oxygen content, a pH value, a conductivity, a temperature, and a turbidity; the atmospheric environmental information includes a temperature, a humidity, an illumination intensity, and an atmospheric pressure intensity in an atmospheric environment; and the electrical device state information in the aquafarm includes currents, voltages, surface temperatures, and electric powers of electrical devices;

preprocessing the multi-dimensional panoramic perception information with statistical analysis to obtain preprocessed multi-dimensional panoramic perception information;

performing feature extraction on the preprocessed multi-dimensional panoramic perception information to determine a threshold range of the preprocessed multi-dimensional panoramic perception information;

analyzing the preprocessed multi-dimensional panoramic perception information with time series analysis to obtain a linear fitting model;

constructing a water quality forecasting-alarming model according to the linear fitting model;

fusing preprocessed water quality information and preprocessed electrical device state information to obtain fused data;

inputting the fused data to a convolutional neural network (CNN) for training to obtain an electrical device fault diagnosis model; and monitoring the aquafarm with the water quality forecasting-alarming model and the electrical device fault diagnosis model, and giving an alarm in response to a substandard water quality or a fault in each of the electrical devices.

Preferably, the constructing a water quality forecasting-alarming model according to the linear fitting model includes:

clustering the preprocessed multi-dimensional panoramic perception information with a fuzzy clustering algorithm according to the linear fitting model to obtain cluster centers;

taking the preprocessed multi-dimensional panoramic perception information as a sample set to construct a Takagi-Sugeno (T-S) fuzzy model; and identifying parameters of the T-S fuzzy model with the cluster centers to obtain the water quality forecasting-alarming model.

Preferably, a target function of the fuzzy clustering algorithm is given by:

$$J_m(U, V) = \sum_{k=1}^{N}\sum_{i=1}^{c}(u_{ik})^m\|X_k - v_i\|^2 + \alpha\sum_{i=1}^{c}\|v_i^{(0)} - v_i\|^2,$$

where, $X_k$ is a kth sample, N is a number of samples, $u_{ik}$ is a degree of membership of the sample $X_k$ to a cluster center $v_i$, m represents a number of clusters, $v_i$ represents an ith cluster center, c represents a number of the cluster centers, $\alpha$ a regularization parameter, and $v_i^{(0)}$ represents a priori estimated value of $v_i$.

Preferably, the fusing preprocessed water quality information and preprocessed electrical device state information to obtain fused data includes:

obtaining, according to cross-correlation between homogeneous sensor signals, total correlation energy of any sensor signal with all of the homogeneous sensor signals, where the homogeneous sensor signals are the preprocessed water quality information or the preprocessed electrical device state information;

normalizing the correlation energy, and calculating a variance contribution rate of normalized correlation energy; and fusing the homogeneous sensor signals according to the variance contribution rate to obtain the fused data.

Preferably, the obtaining, according to cross-correlation between homogeneous sensor signals, total correlation energy of any sensor signal with all of the homogeneous sensor signals includes:

obtaining the correlation energy by:

$$E_i = \sum_{j=1, j\neq i}^{m} E_{ij} = \sum_{j=1, j\neq i}^{m}\sum_{t=0}^{n-1}[R_{ij}(t)]^2, \text{ and}$$

where, $E_i$ represents correlation energy of an ith sensor, m represents a number of homogeneous sensors, n represents a number of data points acquired by the sensors, t=0, 1, 2, . . . , n−1 represents a time series of the signals, $R_{ij}(t)$ represents the cross-correlation between the homogeneous sensor signals, $x_i(t_0)$ represents a value acquired by the ith sensor at a moment $t_0$, and $x_j(t_0+t)$ represents a value acquired by a jth sensor at a moment $t_0+t$.

Preferably, the normalizing the correlation energy, and calculating a variance contribution rate of normalized correlation energy includes:

obtaining the variance contribution rate by:

$$K_{iI} = \frac{[y_i(I) - \mu_i]^2}{n\sigma_i^2}, \text{ and } y_i = \frac{x_i}{\sqrt{E_i^2}},$$

where, $k_{iI}$ represents a variance contribution rate of Ith data acquired by the ith sensor, $y_i(I)$ represents an Ith data point of an energy normalization signal $y_i$, $x_i$ represents a data point acquired by the ith sensor, $\mu_i$ represents a mean of the energy normalization signal $y_i$, and $\sigma_i^2$ represents a variance of the energy normalization signal $y_i$.

Preferably, the fusing the homogeneous sensor signals according to the variance contribution rate to obtain the fused data includes:

obtaining, according to the variance contribution rate, a distribution coefficient of each of data points acquired by the sensors, where the distribution coefficient is calculated by:

$$k_{iI} = \frac{K_{iI}}{\sum_{k=1}^{m}K_{iI}}, I = 1, 2, \ldots, n,$$

where, $K_{iI}$ represents a distribution coefficient of an Ith data point acquired by the ith sensor; and fusing, based on the distribution coefficient, data points acquired by the homogeneous sensors to obtain the fused data.

The present disclosure further provides a system for intelligently monitoring an aquafarm with multi-dimensional panoramic perception, including:

a perception information acquisition module configured to acquire multi-dimensional panoramic perception information of an aquafarm with sensors, where the multi-dimensional panoramic perception information includes water quality information, atmospheric environmental information, and electrical device state information in the aquafarm; the water quality information includes an oxygen content, a pH value, a conductivity, a temperature, and a turbidity; the atmospheric environmental information includes a temperature, a humidity, an illumination intensity, and an atmospheric pressure intensity in an atmospheric environment; and the electrical device state information in the aquafarm includes currents, voltages, surface temperatures, and electric powers of electrical devices;

a preprocessing module configured to preprocess the multi-dimensional panoramic perception information with statistical analysis to obtain preprocessed multi-dimensional panoramic perception information;

a feature extraction module configured to perform feature extraction on the preprocessed multi-dimensional panoramic perception information to determine a threshold range of the preprocessed multi-dimensional panoramic perception information;

a time series analysis module configured to analyze the preprocessed multi-dimensional panoramic perception information with time series analysis to obtain a linear fitting model;

a water quality forecasting-alarming model construction module configured to construct a water quality forecasting-alarming model according to the linear fitting model;

a data fusion module configured to fuse preprocessed water quality information and preprocessed electrical device state information to obtain fused data;

a training module configured to input the fused data to a CNN for training to obtain an electrical device fault diagnosis model; and a monitoring module configured to monitor the aquafarm with the water quality forecasting-alarming model and the electrical device fault diagnosis model, and give an alarm in response to a substandard water quality or a fault in each of the electrical devices.

Preferably, the water quality forecasting-alarming model construction module includes:
- a clustering unit configured to cluster the preprocessed multi-dimensional panoramic perception information with a fuzzy clustering algorithm according to the linear fitting model to obtain cluster centers;
- a model construction unit configured to take the preprocessed multi-dimensional panoramic perception information as a sample set to construct a T-S fuzzy model; and
- a parameter identification unit configured to identify parameters of the T-S fuzzy model with the cluster centers to obtain the water quality forecasting-alarming model.

The present disclosure further provides an apparatus for intelligently monitoring an aquafarm with multi-dimensional panoramic perception, including:
- a multi-parameter water quality sensor module configured to acquire water quality information of an aquafarm;
- a meteorological sensor module configured to acquire atmospheric environmental information;
- an aquafarm device monitoring module configured to acquire electrical device state information in the aquafarm;
- an intelligent gateway in communication connection with the multi-parameter water quality sensor module, the meteorological sensor module, and the aquafarm device monitoring module; and
- an edge computing terminal provided thereon with a high-speed power line carrier (HPLC) communication router and a long term evolution (LTE) communication router, where both the HPLC communication router and the LTE communication router are in communication connection with the intelligent gateway; and the edge computing terminal is configured to monitor the aquafarm according to the water quality information, the atmospheric environmental information and the electrical device state information, and give an alarm in response to a substandard water quality or a fault in each of electrical devices.

According to the specific embodiments provided by the present disclosure, the present disclosure achieves the following technical effects:

The method, system and apparatus for intelligently monitoring an aquafarm with multi-dimensional panoramic perception provided by the present disclosure have the following beneficial effects over the prior art: The present disclosure constructs the water quality forecasting-alarming model with the linear fitting model, fuses the water quality information and the electrical device state information, and trains the fused data to obtain the electrical device fault diagnosis model. In this way, the present disclosure can monitor the aquafarm with the water quality forecasting-alarming model and the electrical device fault diagnosis model, and gives an alarm in response to a substandard water quality or a fault in each of electrical devices, thereby greatly improving operation and maintenance efficiencies of the aquafarm.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

To make the above objectives, features, and advantages of the present disclosure clearer and more comprehensible, the present disclosure will be further described in detail below with reference to the accompanying drawings and the specific examples.

Figure 1:
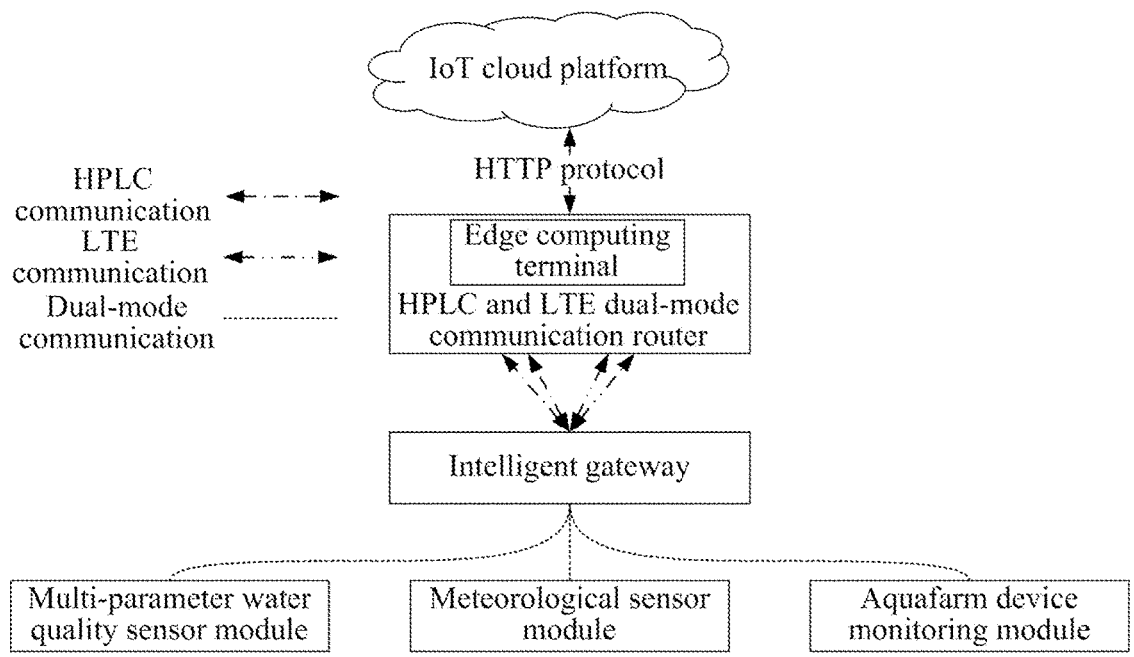
FIG. 1 is an overall architecture diagram of a system for intelligently monitoring an aquafarm with multi-dimensional panoramic perception according to the present disclosure.

Referring to FIG. 1, a method for intelligently monitoring an aquafarm with multi-dimensional panoramic perception includes the following steps:

Step 1: Acquire multi-dimensional panoramic perception information of an aquafarm with sensors, where the multi-dimensional panoramic perception information includes water quality information, atmospheric environmental information, and electrical device state information in the aquafarm; the water quality information includes an oxygen content, a pH value, a conductivity, a temperature, and a turbidity; the atmospheric environmental information includes a temperature, a humidity, an illumination intensity, and an atmospheric pressure intensity in an atmospheric environment; and the electrical device state information in the aquafarm includes currents, voltages, surface temperatures, and electric powers of electrical devices.

In actual aquaculture, the survival rate and quality of fishes depend on a good water quality greatly. In the embodiment of the present disclosure, multiple water quality sensors are integrated to perform real-time detection on a water quality of the aquafarm environment, which realizes multi-parameter online perception on the water quality. There are mainly the following sensors: a dissolved oxygen (DO) sensor, a pH sensor, a conductivity sensor, a temperature sensor, and a turbidity sensor.

The DO sensor is configured to detect an amount of oxygen dissolved in water under a given temperature and a given atmospheric pressure. The sensor detects a dissolved oxygen concentration in real time to prevent mass mortalities of the fishes for oxygen deprivation.

The pH sensor is configured to detect acidity and alkalinity in the water. The sensor can detect a pH value of water in real time, so as not to decrease fish production for an excessively high or low pH value in the water.

The conductivity sensor is configured to detect a concentration of total ions in the water. The sensor monitors a conductivity of the water in real time, and reflects contents of chemical substances such as inorganic acids, alkalis or salts and heavy metals, so as to provide a high-quality water living environment for the fishes.

The temperature sensor is configured to detect a temperature of the water. The sensor detects the temperature of the water in real time so as not to affect normal physiological activities of the fishes, such as food intake and breeding, for an excessively high or low water temperature.

The turbidity sensor measures suspended solids in the water with an amount of light through the water. It reflects pollution of the water, so as not to cause various diseases of the fishes for an overhigh turbidity.

Changes in external environment also have an impact on growth and behaviors of the fishes. Under various stimulations of the external environment, the fishes will be physiologically stressed for a long time. This causes excessive energy consumption, slow growth rate, and poor disease resistance of the fishes. Particularly, ingestive behaviors of the fishes are affected by the external natural environment, such as the temperature, illumination and pressure. In the embodiment of the present disclosure, multiple meteorological sensors are integrated to perform real-time detection on the atmospheric environment of the aquafarm, thereby obtaining data information such as the temperature, humidity, illumination and atmospheric pressure in the aquafarm environment, realizing integrated meteorological detection, and creating a favorable living condition for the fishes. There are mainly the following sensors: a temperature-humidity sensor, an illumination sensor, and an atmospheric pressure sensor.

The temperature-humidity sensor is configured to measure the temperature and humidity of the atmospheric environment. The sensor detects the temperature and humidity of the environment in real time, so as not to affect normal growth of the fishes for excessively high or low temperature and humidity.

The illumination sensor is configured to detect the illumination intensity. The sensor detects illumination of the environment in real time, so as not to affect growth, development and breeding of the fishes for an inappropriate illumination intensity.

The atmospheric pressure sensor is configured to detect the atmospheric pressure intensity. The sensor detects the atmospheric pressure intensity in real time. Any change in the atmospheric pressure will directly affect a concentration of DO in the water. Hence, data uploaded from the atmospheric pressure sensor can be helpful for a manager to determine a content of DO in the water.

In the embodiment of the present disclosure, multiple device sensors are integrated to perform real-time detection on operating states of electrical devices such as aerator, feeding machine and photovoltaic equipment in the aquafarm, thereby obtaining currents, voltages, temperatures, electric powers and other multidimensional data of different devices, and realizing real-time monitoring on the operating states of the devices and abnormality alarming of the devices. There are mainly the following sensors: a current sensor, a voltage sensor, an infrared temperature sensor, and a power sensor.

The current sensor is configured to detect the currents flowing through the electrical devices, so as not to damage the electrical devices for overcurrents.

The voltage sensor is configured to detect the voltages applied to the electrical devices, so as not to damage the electrical devices for overvoltages.

The infrared temperature sensor is configured to detect the surface temperatures of the electrical devices, thereby discovering defects and abnormalities of the devices, and facilitating maintenance of the manager on the electrical devices.

The power sensor is configured to detect power consumptions of the electrical devices, determine working efficiencies of the devices, and better determine working states of the devices according to mutual relationships between the powers, the voltages and the currents. This reduces electrical faults due to single measurement factors.

Step 2: Preprocess the multi-dimensional panoramic perception information with statistical analysis to obtain preprocessed multi-dimensional panoramic perception information.

In the present disclosure, the multi-dimensional panoramic perception information is preprocessed by an edge computing terminal. Hence, the multi-dimensional panoramic perception information acquired by the sensors is first uploaded to the edge computing terminal.

In order to avoid repeated wiring, the present disclosure proposes dual-mode communication according to access requirements and data transmission requirements of various devices in the complicated aquafarm environment. This technique takes HPLC communication as a main communication mode and LTE radio communication as a backup. HPLC and LTE communication routers are provided in the edge computing terminal. After powered on, the HPLC and LTE communication routers are networked to establish communication connection with an intelligent gateway.

In order to enhance access management and data communication of the devices, the dual-mode communication makes use of Internet protocol (IP)-based power line carriers. That is, the IPv6-based HPLC communication network adopts an institute of electrical and electronic engineers (IEEE) 802.15.4 standard on a media access control (MAC) layer. Each device in the IP-based communication is provided with a unique address. Through the IP-based power line carriers, multiple devices on a same networking hierarchy are grouped in hierarchical networking. The edge computing terminal manages the devices uniformly and allocates different networking periods to different groups of devices, such that multiple hierarchies of devices are networked orderly and reliably.

Upon successful communication networking, the dual-mode communication routers each compute a signal-to-noise ratio (SNR) on the communication link in real time according to a data communication condition of the devices as well as an uplink success rate, a downlink success rate and other key indicators in single transmission of the data. The edge computing terminal determines a networking state and a networking result in the HPLC and LTE dual-mode networked communication according to indicator data, and transmits the networking state and the networking result to a back end, so as to effectively track the communication connection.

Figure 2:
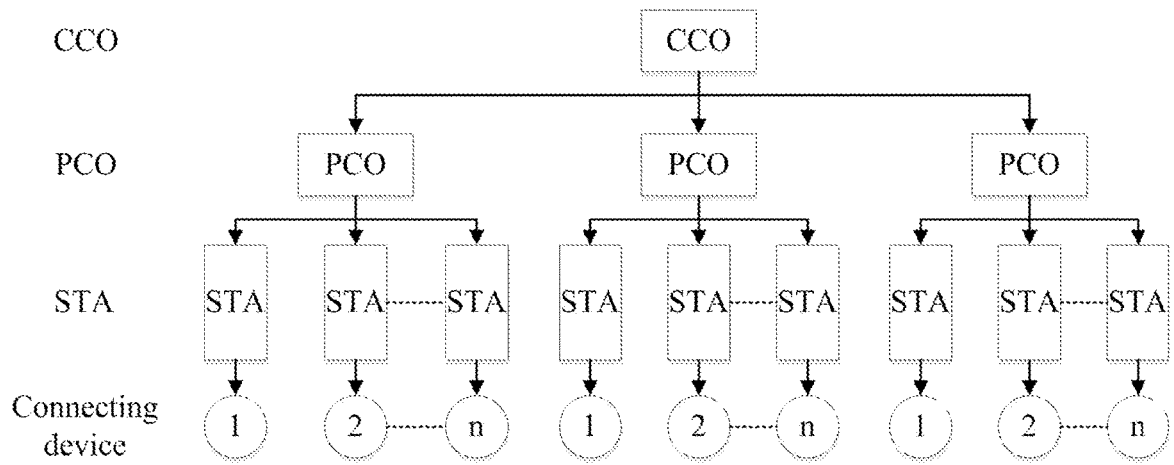
FIG. 2 is a networking diagram of HPLC communication according to the present disclosure.

FIG. 2 shows a networking diagram of HPLC communication in the embodiment. The HPLC is a technique using existing power lines to transmit analog or digital signals at a high speed through carriers. It is a special communication method in power systems. The HPLC has a communication band of 700 KHz to 12 MHz. The maximum communication rate at the application layer can be up to 2 Mbps. This technique supports multi-level networking and automatic routing, and completely satisfies requirements on the bandwidth, communication distance and reliability in the farming environment of the aquafarm. In an HPLC network, there are three types of nodes, including a central coordinator (CCO as an HPLC head end), a proxy coordinator (PCO as an HPLC tail end), and a station (STA as an HPLC tail end). The three types of nodes are formed into a tree structure. A central scheduling method is used in the communication. After powered on, the CCO detects the whole network to determine the PCO and the STA, monitors a message of the STA or queries the STA actively, and performs transmission management and control in a carrier sense multiple access (CSMA) manner.

Figure 3:
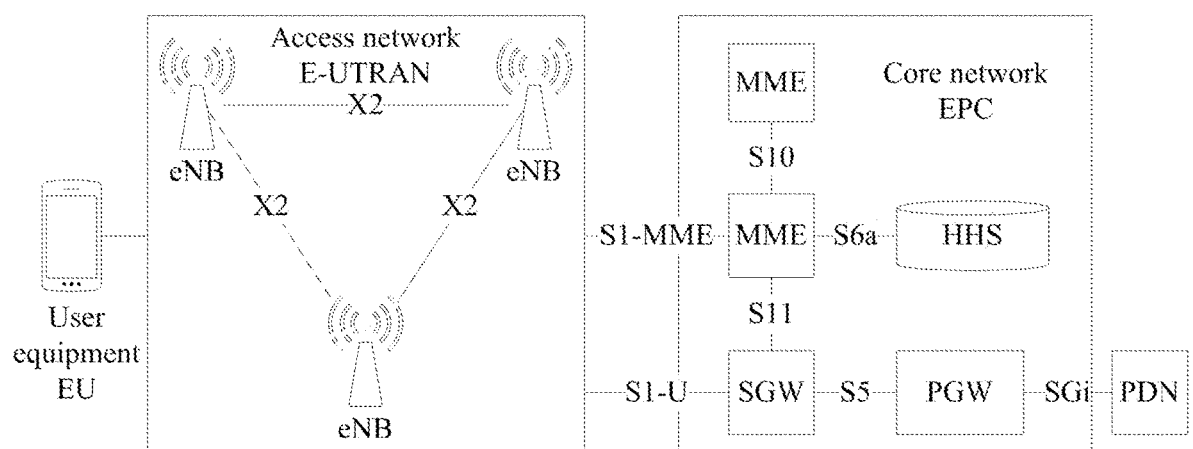
FIG. 3 is an architecture diagram of an LTE communication network according to the present disclosure.

FIG. 3 shows an architecture diagram of an LTE communication network in the embodiment. Key techniques such as orthogonal frequency division multiplexing (OFDM) and multi-input & multi-output (MIMO) are introduced to the LTE communication network. Therefore, the spectral efficiency and data transmission rate are accelerated obviously, multiple bandwidths are supported in allocation, the spectrum allocation is more flexible, and the system capacity and coverage are also improved significantly. The LTE communication network includes four main components, namely an end user (EU), an evolved universal terrestrial radio access network (E-UTRAN), an evolved packet core (EPC), and a public data network (PDN). Each evolved node B (eNB) is connected to the EPC through an interface S1, and may also be connected to a neighboring eNB through an interface X2. It is mainly intended to forward a signal and a data packet in handover. The EPC mainly consists of a mobility management entity (MME), a serving gateway (SGW), and a packet data network gateway (PGW). The evolved packet system (EPS) is termed as a collection of multiple EPCs. The interface S1 is provided between the EPC and the E-UTRAN. Since a user plane and a control plane are separated, the interface S1 may also include a user-plane interface S1-U and a control-plane interface S1-MME. As a database server in the EPC, the home subscriber server (HSS) is stored therein with data information of all users belonging to the EPC. When a user is connected to the MME (a control-plane network element in the EPC), data submitted by the user is compared with data in the HSS data server for authentication.

The edge computing terminal preprocesses the real-time and online acquired data on the atmosphere, water quality and electrical devices in the aquafarm scenarios with statistical analysis:

(1) Missing data is padded with a statistical value for repair. Namely, a miss rate for the data is determined. If the miss rate is low (less than 95%) and the important level is low, the missing data is padded according to a data distribution condition. The data is padded with a mean if satisfying uniform distribution. In case of skewed distribution, the data is padded with a median.

(2) For abnormal data, an outlier is determined in combination with a box plot and a median absolute deviation (MAD) and then is removed.

Step 3: Perform feature extraction on the preprocessed multi-dimensional panoramic perception information to determine a threshold range of the preprocessed multi-dimensional panoramic perception information.

Further, Step 3 includes:

Perform the feature extraction on the preprocessed data information with principal component analysis (PCA) and a rough set (RS) theory to determine optimal threshold ranges of key parameters on the atmosphere, the water quality and the electrical devices in the aquafarm environment.

The PCA has a following principle:

The PCA is a method that simplifies multiple variables into few variables with dimensionality reduction. With the PCA, not only can samples be distinguished, but also most important variables in a multivariate data matrix can be identified, thereby selecting an optimal processing mode. (1) Ranges of variables in an input dataset are standardized, such that each of the ranges can be analyzed in a roughly proportional manner. A standard deviation is given by:

$$S = \frac{1}{n}\sqrt{\sum_{i=1}^{n}(x_i - \bar{x})^2}.$$

A covariance matrix is calculated, so as to better understand changes of the variables in the input dataset relative to an average, and reveal data correlation between the variables. (3) Eigenvectors and eigenvalues of the covariance matrix are calculated to select principal components. The calculated eigenvectors are arranged in a descending order according to the eigenvalues to find the principal components in levels of importance. In this step, components with low levels of importance (low eigenvalues) are abandoned, while other components, namely the eigenvectors, are formed into a vector matrix. (4) The eigenvectors of the covariance matrix are formed into new eigenvectors. Multiplying a transpose of the original dataset by a transpose of the eigenvectors repositions data from an original axis to an axis of the principal components.

The RS theory has a following principle:

The RS theory is a mathematical tool that can quantitatively analyze inaccurate, inconsistent and incomplete information and knowledge. A pair of approximate operators are derived from an approximate space. It is assumed that M is an information table, and the M is formally described as:

$$M = (U, At, \{V_a | a \in At\}, \{I_a | a \in At\}).$$

U is a set of finite objects; At is a set of finite non-null attributes; $V_a$ represents a range of a value of an attribute $a \in At$, namely a value domain of the attribute a; $I_a$ is an information function of $U \rightarrow V_a$, and $I_a(x)$ represents a value of an object x at the attribute a.

Step 4: Analyze the preprocessed multi-dimensional panoramic perception information with time series analysis to obtain a linear fitting model.

Specifically, Step 4 includes:

Analyze spatio-temporal variation rules of preprocessed data on the atmosphere, the water quality and the electrical devices in different time scales with the time series analysis to obtain a dynamic change trend (the linear fitting model) for the atmosphere, the water quality and operating states of the electrical devices. The time series analysis in the present disclosure has a following principle:

For a time series $\{X_t, t \in T\}$, a sequential value $X_t$ at any moment is a random variable, and its distribution function is labeled as $F_t(x)$. According to feature statistics, a mean, a variance, an auto-covariance function, and a self-correlation coefficient are respectively defined as follows:

Mean: It represents the average values of the time series at various moments, and is defined as:

$$\mu_t = EX_t = \int_{-\infty}^{+\infty} x dF_t(x).$$

Variance: It represents an average degree fluctuating around the mean at various moments in the time series, and is defined as:

$$\sigma_t^2 = DX_t = E(X_t - \mu_t)^2 = \int_{-\infty}^{+\infty} (x - \mu_t)^2 dF_t(x).$$

Auto-covariance function: It represents direct correlation between any two moments in the time series. Assuming t, s∈ T, the auto-covariance function is defined as:

$$\gamma(t,s) = E[(X_t - \mu_t)(X_s - \mu_s)].$$

Self-correlation coefficient: It is the same as the auto-covariance function, and is defined as:

$$\rho(t,s) = \frac{\gamma(t,s)}{\sqrt{DX_t \cdot DX_s}}.$$

The time series modeling is basically as follows: (1) Dynamic data of a time series of an observed system is acquired with an observational method, a statistical method, a sampling method and so on. (2) A correlation diagram is drawn according to the dynamic data. Correlation analysis is performed to obtain a self-correlation function. A jump point and an inflection point can be found according to the correlation diagram. The jump point refers to an observed value different from other data. The jump point is to be considered in modeling if it is the correct observed value. Or otherwise, the jump point is adjusted to a desired value. The inflection point refers to a point through which the time series is abruptly changed from an uptrend to a downtrend. In case of the inflection point, different models must be used in modeling to fit the time series piecewise.

(3) An appropriate random model is identified for curve fitting, namely the observed data of the time series is fitted with a universal random model. The linear fitting model is given by:

$$T_t = a + bt + I_t$$

$$E(I_t) = 0$$

$$Var(I_t) = \sigma^2$$

The random time series model is generally expressed as:

$$Y_n = F(Y_{n-1}, Y_{n-2}, \ldots, \mu_n).$$

If a linear equation, a first-order lag and a random disturbance term ($\mu_n = \varepsilon_n$) of a white noise are taken, the model is expressed as:

$$Y_n = aY_{n-1} + \varepsilon_n.$$

$\varepsilon_n$ represents a first-order white noise.

Step 5: Construct a water quality forecasting-alarming model according to the linear fitting model.

Further, Step 5 includes: Cluster the preprocessed multi-dimensional panoramic perception information with a fuzzy clustering algorithm according to the linear fitting model to obtain cluster centers.

Take the preprocessed multi-dimensional panoramic perception information as a sample set to construct a T-S fuzzy model.

Identify parameters of the T-S fuzzy model with the cluster centers to obtain the water quality forecasting-alarming model.

Step 5 is further described below with reference to a specific embodiment.

Figure 4:
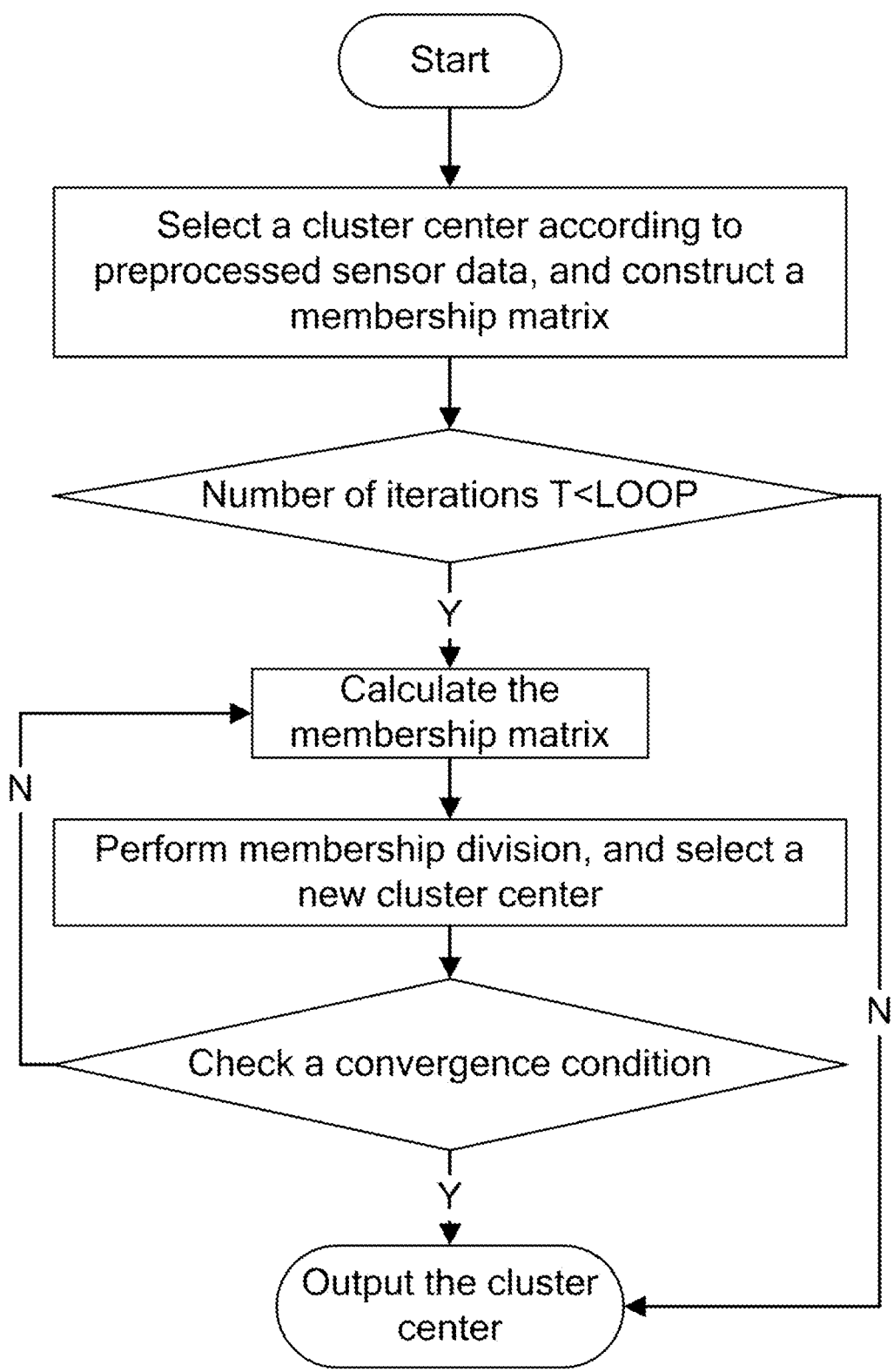
FIG. 4 is a flowchart of a fuzzy clustering algorithm according to the present disclosure.

According to the dynamic change trend for the water quality and the operating states of the electrical devices obtained with the time series analysis, data correlation is performed on data of the sensors in combination with the obtained atmosphere data by using the fuzzy clustering algorithm. The T-S fuzzy model system is identified and analyzed to construct the water quality forecasting-alarming model. This provides a theoretical support for intelligent aquaculture, operation and maintenance of the aquafarm. FIG. 4 shows a flowchart of data correlation of a fuzzy matrix. The fuzzy clustering algorithm in the present disclosure has a following principle:

During classification, if the element $r_{ij}$ in a classification matrix is changed to any value in a closed interval [0,1] from being only either 0 or 1 in a set {0,1}, hard classification is converted into fuzzy clustering. $r_{ij}$ serves as a similarity coefficient between samples $x_i$ and $x_j$. The fuzzy matrix corresponding to the fuzzy clustering has the following properties:

For any i and j, $r_{ij} \in [0,1]$.
For any i, $$\sum_{k=1}^{n} r_{ij} = 1.$$

Considerations are given to a sample set:

$$X = \{X_1, X_2, \ldots, X_N\}.$$

$X_k = [x_{k1}, x_{k2}, \ldots, x_{kn}]$ (k=1, 2, ..., N), N being a number of samples. The sample set is classified as a class c, c∈ {2, 3, ..., N−1}. $v_i$ is labeled as a center of an ith class. Assuming that $V = (v_1, v_2, \ldots, v_c)$ is a clustering center matrix, each class may be represented by its cluster center $v_i$.

According to the fuzzy clustering algorithm, a feature point of each class is found to take as a central point of the class and a degree of membership of each data point to the class. This is generally realized by minimizing a target function. Since target attributes reported by different sensors are varied, the present disclosure selects a cluster center from the common attribute.

In the present disclosure, a target function of the fuzzy clustering algorithm is defined as:

$$J_m(U, V) = \sum_{k=1}^{N} \sum_{i=1}^{c} (u_{ik})^m \|X_k - v_i\|^2 + \alpha \sum_{i=1}^{c} \|v_i^{(0)} - v_i\|^2.$$

$X_k$ is a kth sample, N is a number of samples, $u_{ik}$ is a degree of membership of the sample $X_k$ to the cluster center $v_i$ (namely a probability that $X_k$ belongs to $v_i$), m represents a number of clusters (a number of classes), $v_i$ represents an ith cluster center, c represents a number of the cluster centers, $\alpha$ is a regularization parameter, and $v_i^{(0)}$ represents a priori estimated value of $v_i$. The regularization parameter $\alpha$ controls contribution degrees of $$\sum_{k=1}^{N} \sum_{i=1}^{c} (u_{ik})^m \|X_k - v_i\|^2 \text{ and } \sum_{i=1}^{c} \|v_i^{(0)} - v_i\|^2.$$

The $v_i^{(0)}$ is the priori estimated value of $v_i$. An optimal solution of the target function can be obtained with a Lagrange multiplier. Assuming:

$$L(U, V, \lambda) = \sum_{k=1}^{N}\sum_{i=1}^{c}(u_{ik})^m\|X_k - v_i\|^2 + \alpha\sum_{i=1}^{c}\|v_i^{(0)} - v_i\|^2 - \sum_{k=1}^{N}\lambda_k\left(\sum_{i=1}^{c}u_{ik} - 1\right)$$

then:

$$u_{ik} = \left(\frac{\lambda_k}{m\|X_k - v_i\|^2}\right)^{\frac{1}{m-1}}; \text{ and } \left(\frac{\lambda_k}{m}\right)^{\frac{1}{m-1}} = \frac{1}{\sum_{i=1}^{c}\left(\frac{1}{\|X_k - v_i\|^2}\right)^{\frac{1}{m-1}}}.$$

The degree of membership is calculated by:

$$u_{ik} = \frac{1}{\sum_{j=1}^{c}\left(\frac{\|X_k - v_i\|}{\|X_k - v_j\|}\right)^{\frac{2}{m-1}}}.$$

A partial derivative of $L(I,V,\lambda)$ with respect to $v_i$ ($i=1, 2, \ldots, c$) is calculated, and assumed as zero, which obtains:

$$\frac{\alpha L(U, \lambda)}{\alpha v_i} = -\sum_{k=1}^{N} 2(u_{ik})^m(X_k - v_i) - 2\alpha(v_i^{(0)} - v_i) = 0.$$

As a result:

$$v_i = \frac{\sum_{k=1}^{N}(u_{ik})^m x_k - \alpha v_i^{(0)}}{\sum_{k=1}^{N}(u_{ik})^m - \alpha}; \text{ and}$$

The fuzzy clustering algorithm optimizes the classes in iteration, and continues to improve parameters U and V. If:

$$\|U^{(l+1)} - U^{(l)}\| < \varepsilon,$$

the calculation is stopped, and the fuzzy dividing matrix U and the cluster center V are output.

The T-S fuzzy model system is identified and analyzed as follows:

The T-S fuzzy model may be expressed as:

$$y_i^k = p_{i0} + \sum_{t=1}^{n} p_{it}x_{kt}.$$

$i=1, 2, \ldots, R$; $R_i$ is an ith fuzzy rule, R being a number of fuzzy rules; $X_k=[x_{k1}, x_{k2}, \ldots, x_{kn}]$ is a kth input variable, $k=1, 2, \ldots, N$; $A_{ij}$ is a fuzzy subset of an antecedent, $j=1, 2, \ldots, n$, and N being a number of samples; n represents a number of variables in each sample; $y_i^k$ is an output of the ith rule; and $p_{il}$ is a parameter of a consequence, $l=0, 1, \ldots, n$.

The Gaussian membership function is used for the fuzzy set $A_{ij}$:

$$A_{ij}(x_{kj}) = \exp\left(-\frac{(x_{kj} - v_{ij})^2}{2\sigma_{ij}^2}\right).$$

$v_{ij}$ is a value of a cluster center of an input variable, and $\sigma_{ij}$ is a width of the Gaussian membership function. $\sigma_{ij}$ is calculated by:

$$\sigma_{ij}^2 = \frac{(\max x_{kj} - \min x_{kj})^2}{2\gamma_a^2}, (j, j = 1, 2, \ldots, n).$$

If R=c, an output corresponding to a kth input obtained by identifying the T-S fuzzy system is a weighted average for outputs of the rules:

$$\hat{y}_k = \sum_{i=1}^{c}\lambda_{ik}y_i^k = \sum_{i=1}^{c}\lambda_{ik}X_k\pi_i = X_{(K)}P.$$

Where:

$$\lambda_{ik} = \frac{\tau_{ik}}{\sum_{j=1}^{c}\tau_{jk}}, \tau_{ik} = \prod_{j=1}^{n}A_{ij}(x_{kj}) \text{ and}$$

$$\pi_i = [p_{i0}, p_{i1}, \ldots, p_{in}]^T, (i = 1, 2, \ldots, c)$$

are conclusion parameters in the ith rule.

$$X_{(K)}' = [\lambda_{1k}, \ldots, \lambda_{ck}, \lambda_{1k}x_{k1}, \ldots, \lambda_{ck}x_{k1}, \ldots, \lambda_{1k}x_{kn}, \ldots, \lambda_{xk}x_{kn}], (k=1,2,\ldots,N);$$

and $$P = [p_{10}, \ldots, p_{c0}, p_{11}, \ldots, p_{c1}, p_{in}, \ldots, p_{cn}]^T.$$

When a set of input and output data is given:

$$[x_{k1}, x_{k2}, \ldots x_{km}] \to y_k(K=1, \ldots, N),$$

$Y=XP$ is assumed, $Y=[y_1, \ldots, y_N]^T$. The matrix X is determined by:

$$X = [X_0, X_1, \ldots, X_n];$$

$$X_0 = \begin{bmatrix} \lambda_{11} & \cdots & \lambda_{c1} \\ \vdots & \cdots & \vdots \\ \lambda_{1N} & \cdots & \lambda_{cN} \end{bmatrix}; \text{ and } X_1 = \begin{bmatrix} x_{11}\lambda_{11} & \cdots & x_{11}\lambda_{c1} \\ \vdots & \cdots & \vdots \\ x_{1N}\lambda_{1N} & \cdots & x_{1N}\lambda_{cN} \end{bmatrix}.$$

$i=1, 2, \ldots, n$. The conclusion parameter is calculated by:

$$P = (X^T X)^{-1} X^T Y.$$

When the variable of the antecedent is selected, and the number of fuzzy subspaces is given, the problem about any fuzzy subspace is to determine a membership function in the antecedent, namely determine a parameter in the membership function that makes performance indicators minimized.

Step 6: Fuse preprocessed water quality information and preprocessed electrical device state information to obtain fused data.

Further, Step 6 includes:

Obtain, according to cross-correlation between homogeneous sensor signals, total correlation energy of any sensor signal with all of the homogeneous sensor signals, where the homogeneous sensor signals are the preprocessed water quality information or the preprocessed electrical device state information.

Obtain the correlation energy by:

$$E_i = \sum_{j=1,j\neq i}^{m} E_{ij} = \sum_{j=1,j\neq i}^{m} \sum_{t=0}^{n-1} [R_{ij}(t)]^2 \text{ and}$$

$$R_{ij}(t) = \frac{1}{n-t} \sum_{t_0=1}^{n-t} x_i(t_0) x_j(t_0 + t).$$

$E_i$ represents correlation energy of an ith sensor, m represents a number of homogeneous sensors, n represents a number of data points acquired by the sensors, $t=0, 1, 2, \ldots, n-1$ represents a time series of the signals, $R_{ij}(t)$ represents the cross-correlation between the homogeneous sensor signals, $x_i(t_0)$ represents a value acquired by the ith sensor at a moment $t_0$, and $x_j(t_0+t)$ represents a value acquired by a jth sensor at a moment $t_0+t$.

Normalize the correlation energy, and calculate a variance contribution rate of normalized correlation energy.

Fuse the homogeneous sensor signals according to the variance contribution rate to obtain the fused data.

Step 6 is further described below with reference to a specific embodiment.

Figure 5:
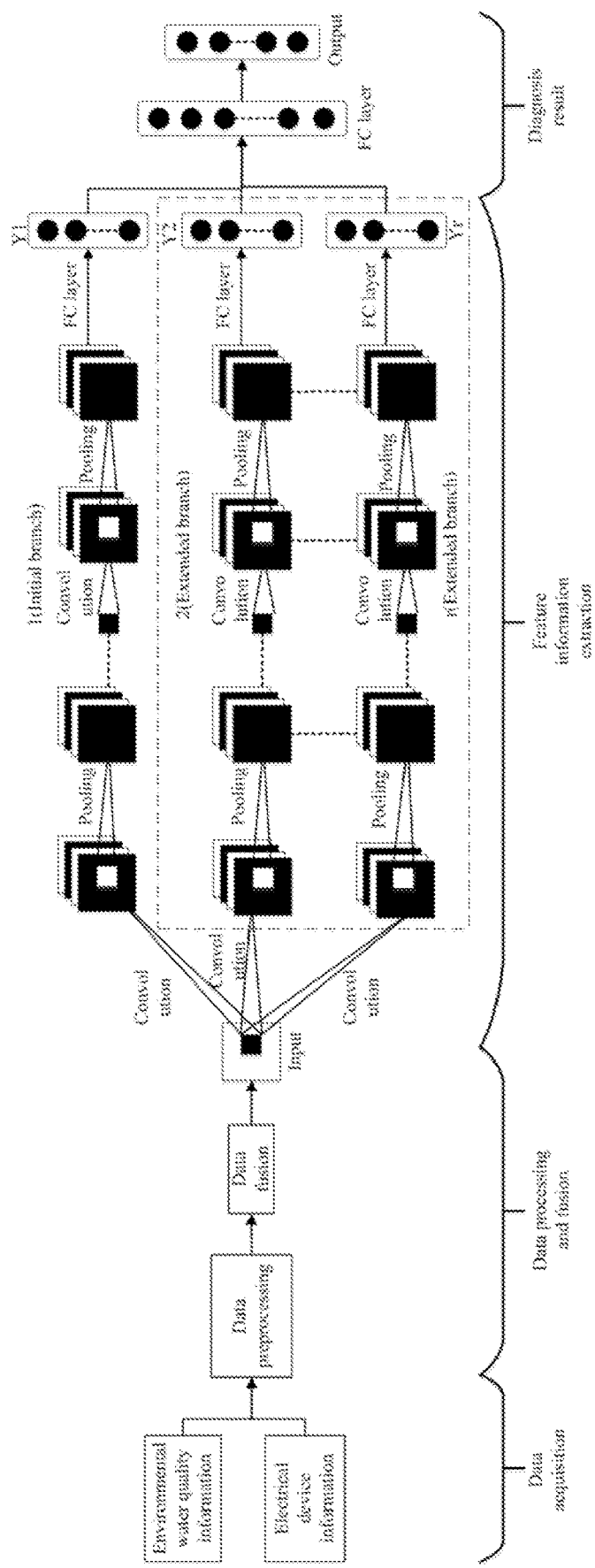
FIG. 5 is a flowchart of fault diagnosis of an electrical device according to the present disclosure.

It is extremely unscientific to determine operating states of the sensors only through information returned from an electrical device monitoring sensor, because the information may be unreliable for external noise interferences. This problem can be solved by using multiple pieces of sensor information. By integrating and fusing monitored multi-source information, features of the monitored object can be reflected comprehensively. Hence, in combination with the returned environmental water quality information, the embodiment performs data fusion on the water quality information and the electrical device monitoring information with multi-source information fusion to construct a multi-source information device fault diagnosis model, thereby improving a monitoring efficiency for fault diagnosis of the electrical device. FIG. 5 shows a flowchart of fault diagnosis of an electrical device. The multi-source information fusion has a following principle:

In the embodiment, data partition is performed according to information detected by the water quality sensor and the electrical device sensor. Data of the sensors is fused with correlated variance contribution rates. Fused data is taken as an input of an adaptive deep convolutional neural network (ADCNN) to realize the fault diagnosis of the electrical device.

Multi-source homogeneous information data layers are fused based on the correlated variance contribution rates. The method with the correlated variance contribution rates makes effective use of correlation and complementarity between signals of the sensors. Based on variance contribution rates, fused coefficients are allocated according to degrees of correlation between information. By fusing multiple homogeneous signals into one signal, homogeneous information is fused dynamically to prevent leakage and loss of effective information.

Assuming that there are m homogeneous sensor signals $x_1(n), x_2(n), \ldots, x_m(n)$, cross-correlation between any two signals may be expressed as:

$$R_{x_i x_j}(t) = \frac{1}{n-t} \sum_{t_0=1}^{n-t} x_i(t_0) x_j(t_0 + t).$$

In the equation, n is a number of data points in each signal; and $t=0, 1, 2, \ldots, n-1$ represents a time series of the signal. Total correlation energy of a signal of an ith sensor with all of the homogeneous sensor signals may be expressed as:

$$E_i = \sum_{j=1,j\neq i}^{m} E_{ij} = \sum_{j=1,j\neq i}^{m} \sum_{t=0}^{n-1} [R_{ij}(t)]^2.$$

In the equation, $$E_{ij} = \sum_{t=0}^{n-1} [R_{ij}(t)]^2$$

is an energy expression equation of a discrete signal, and represents signal energy obtained through cross-correlation calculation. After the correlation energy $E_i$ is obtained, energy normalization is performed on the m homogeneous sensor signals by:

$$y_i = \frac{x_i}{\sqrt{E_i^2}}.$$

In the equation, $x_i$ is a signal series of data acquired by the ith sensor within time T at a certain sampling frequency, n discrete data values of an energy normalized signal $y_i$ are $y_i(1), y_i(2), \ldots, y_i(n)$, and a variance contribution rate is defined as:

$$K_{il} = \frac{[y_i(l) - \mu_i]^2}{n\sigma_i^2}.$$

In the equation, $y_i(I)$ represents an Ith data point of the energy normalization signal $y_i$, $K_{il}$ represents a variance contribution rate of Ith data acquired by the ith sensor, $$\mu_i = \frac{1}{n} \sum_{h=1}^{n} y_i(I)$$

represents a mean of the energy normalization signal $y_i$, and $$\sigma_i^2 = \frac{1}{n-1} \sum_{h=1}^{n} [y_i(I) - \mu_i]^2$$

represents a variance of the energy normalization signal $y_i$.

According to variance contribution rates of homogeneous signals acquired by the m homogeneous sensors at a moment, a distribution coefficient of an Ith data point $x_i(I)$ of any sensor signal $x_i$ is obtained by:

$$k_{iI} = \frac{K_{iI}}{\sum_{k=1}^{m} K_{iI}}, I = 1, 2, \ldots, n.$$

The m homogeneous sensor signals are fused into one signal based on the distribution coefficient. The value of an Ith data point of a fused signal x is obtained by:

$$x(I) = \sum_{i=1}^{m} k_{iI} \cdot y_i(I), I = 1, 2, \ldots, n.$$

Step 7: Input the fused data to a CNN for training to obtain an electrical device fault diagnosis model.

Further, Step 7 includes:

Input fused information to the constructed ADCNN, extract fault features of various types of the information adaptively with the ADCNN and perform feature fusion. The fusion considers correlation and complementarity between homogeneous signals to avoid loss of key fault information. The ADCNN can optimize a hierarchical structure of the network according to actual network performance. With a rate of convergence as an evaluation indicator, the network is extended adaptively to extract typical fault features of various types of multi-source information. The convolutional layer of the ADCNN is composed of multiple feature maps. Each feature map is connected to a local region of a feature map on an upper layer through a convolution kernel. With convolutional filtering on each input feature map, data features are extracted. The mathematical model of the convolutional layer may be expressed as:

$$X_j^I = f\left(\sum_{i \in M_j} X_i^{I-1} * K_{ij}^I + b_j^I\right).$$

In the equation, $M_j$ is an input feature map; $X_j^I$ is a jth output feature map on an Ith layer; $K_{ij}^I$ is a convolution kernel; $b_j^I$ is a bias; and * represents a convolution operation; and $f(\cdot)$ is an activation function.

The pooling layer is mainly intended to reduce a dimensionality of data by scaling and mapping the feature map on the upper layer. The max-pooling function is mathematically expressed as:

$$P_j = \max_{j \in S} X_j.$$

In the equation, $P_j$ represents a jth output of the pooling layer; and S is a size of a pooling window.

In the ADCNN, there are r branches in total, including an initial branch and extended branches. The initialization network only includes one initial branch, and takes a rate of convergence of the network as an evaluation indicator to determine whether the network is to be adaptively extended. The rate of convergence $v_{cs}$ satisfies:

$$V_{cs} = E_{pre} - E_{cur} \geq C_h.$$

In the equation, $E_{pre}$ is an average error of previous network training; $E_{cur}$ is an average error of current network training; and $C_h$ is a desired threshold for the rate of convergence. In the embodiment, a mean error in network training is calculated by:

$$E_{mean} = \frac{\sum_{j=1}^{N} \sum_{k=1}^{c} \left(y_i^j - y_{lab}^j\right)^2}{N}.$$

In the equation, N is a total number of training samples; c is a number of classes; $y_i^j$ is an output of an ith neuron corresponding to a jth training sample; and $y_{lab}^j$ is a real class label of the training sample.

In adaptive extension, a novel fully connected (FC) layer is required in the extended structure to fuse output results of the initial branch and the extended branches into a new output result. Further, the excitation function of the output layer fuses the output results as:

$$y = f\left(y_1 + \sum_{k=2}^{r} \omega_k y_k\right).$$

In the equation, $y_1$ and $y_k$ are respectively output results of the initial branch and the extended branch k; $\omega_k$ is an output weight of the extended branch k; and the initial branch has an output weight of 1.

When the ADCNN network is used for training, the network structure and related parameters of the initial branch are unchanged. The output result $y_1$ of the initial branch is retained first. After the extended branches are trained completely, the output result $y_1$ is fused. The corresponding weights of the extended branches are updated through a back propagation (BP) algorithm. When all extended branches are trained completely, adaptive extended learning is accomplished. After all extended branches are trained completely, a diagnosis result can be obtained through the output layer of the network.

Step 8: Monitor the aquafarm with the water quality forecasting-alarming model and the electrical device fault diagnosis model, and give an alarm in response to a substandard water quality or a fault in each of the electrical devices.

The present can feed an abnormal water quality back to the manager timely with the water quality forecasting-alarming model, such that the water quality of the aquafarm is adjusted timely, and a loss from mass mortalities of fishes due to inappropriate farming conditions is reduced. Meanwhile, through the device fault diagnosis model, the present disclosure can determine a faulty electrical device according to acquired current, voltage, outer surface temperature, electric power and other data information, for ease of timely maintenance of a maintenance staff.

It is to be noted that after analyzing and processing the water quality information, the atmospheric environmental information and the electrical device state information in the aquafarm with the edge computing terminal, the present disclosure further uploads a final processed result to an Internet of things (IoT) cloud platform through the hypertext transfer protocol (HTTP), and transmits a control signal to an intelligent switch through the power line carriers, thereby intelligently controlling terminal devices such as aerator, feeding machine and photovoltaic equipment.

Figure 6:
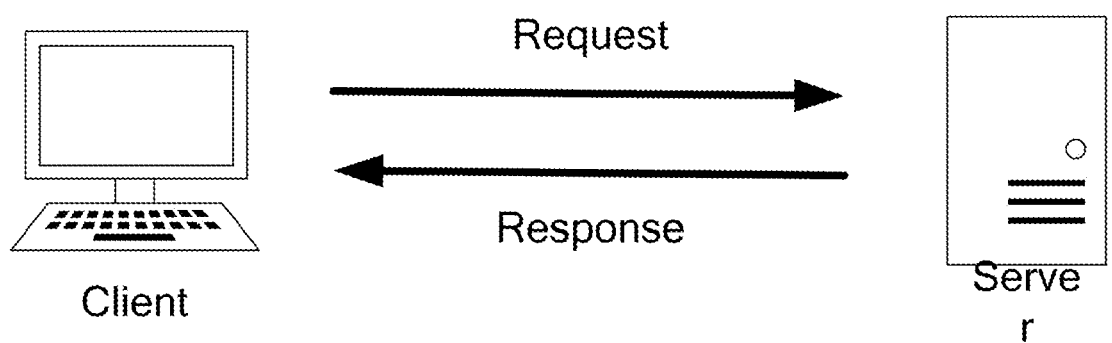
FIG. 6 is a diagram of an HTTP request and response model according to the present disclosure.

The HTTP protocol is a protocol through which a server from the world wide web (WWW) transmits hypertexts to a local browser. It transmits data based on a transmission control protocol/Internet protocol (TCP/IP). The HTTP protocol is realized on a client-server architecture, as shown in FIG. 6. The edge computing terminal as the HTTP client sends all requests through a uniform resource locator (URL)

to the HTTP server, namely the Web server (the IoT cloud platform). The Web server sends response information to the client according to a received request. The HTTP request message sent mainly includes four parts, namely a request line that describes a request type, a resource to be accessed and an HTTP version used; a header that describes additional information to be used by the server; a blank line; and request data, which is also called a main body, and to which any other data are added. The response message also includes four parts, namely a status line composed of a version number of the HTTP protocol, a status code and a status message; a header that describes some additional information to be used by the client; a blank line; and a body, namely text information returned from the server to the client. The specific data transmission process in the embodiment is as follows:

1) The client is connected to the Web server: The client establishes TCP socket connection with a HTTP port (defaulted to 80) of the Web server.
2) The client sends an HTTP request: Through a TCP socket, the client sends a request message of a text to the Web server.
3) The server receives the request and returns an HTTP response: The Web server analyzes the request, and locates a requested resource. The server writes a resource copy to the TCP socket to be read by the client.
4) The server releases the TCP connection: If the connection mode is close, the server actively closes the TCP connection, while the client passively closes the connection and releases the TCP connection. If the connection mode is keepalive, the connection is kept for a period of time, and the request can be received continuously within that time.
5) The client browser analyzes a hypertext markup language (HTXL) content: The client browser first analyzes a status line to check a status code that describes whether the request is successful. Then, the client browser analyzes each response header. The response header indicates that the following descriptions are a HTML document including a plurality of bytes and a character set of the document. The client browser reads response data HTML, formats the response data according to a grammar of the HTML, and displays formatted response data in a window.
6) The manager checks an uploaded data result, takes the power line carrier as a transmission carrier of the control signal, and intelligently controls underlying devices such as the intelligent switch, the aerator, the feeding machine and the photovoltaic equipment with the intelligent switch.

Based on the method for intelligently monitoring an aquafarm with multi-dimensional panoramic perception, the present disclosure further provides an apparatus for intelligently monitoring an aquafarm with multi-dimensional panoramic perception, including: a multi-parameter water quality sensor module configured to acquire water quality information of an aquafarm; a meteorological sensor module configured to acquire atmospheric environmental information; an aquafarm device monitoring module configured to acquire electrical device state information in the aquafarm; an intelligent gateway in communication connection with the multi-parameter water quality sensor module, the meteorological sensor module, and the aquafarm device monitoring module; and an edge computing terminal provided thereon with an HPLC communication router and an LTE communication router. Both the HPLC communication router and the LTE communication router are in communication connection with the intelligent gateway. The edge computing terminal is configured to monitor the aquafarm according to the water quality information, the atmospheric environmental information and the electrical device state information, and give an alarm in response to a substandard water quality or a fault in each of electrical devices.

Figure 7:
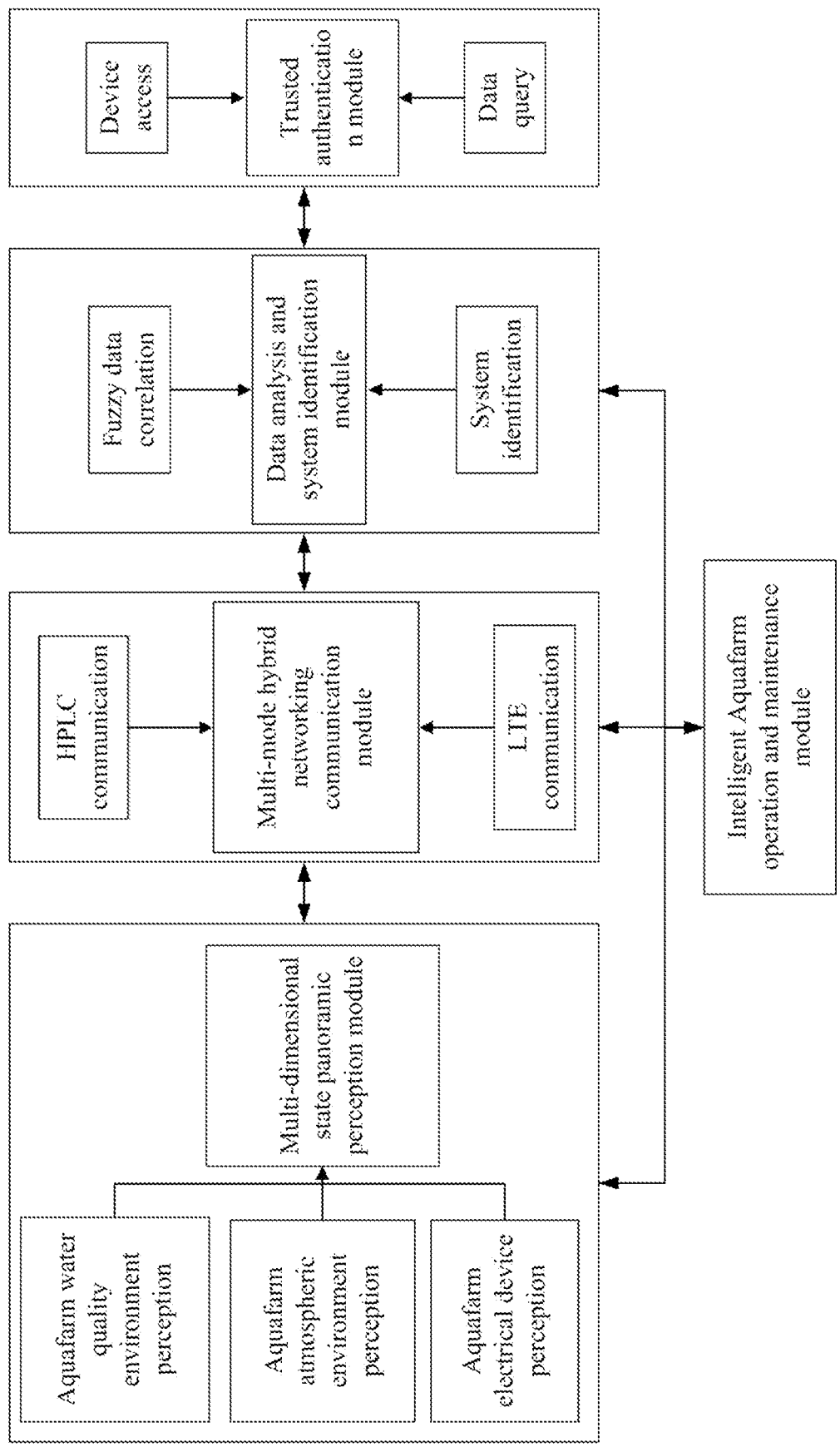
FIG. 7 is a schematic diagram of an apparatus for intelligently monitoring an aquafarm with multi-dimensional panoramic perception according to the present disclosure.

In actual applications, the apparatus for intelligently monitoring an aquafarm with multi-dimensional panoramic perception provided by the present disclosure further includes a multi-mode hybrid networking communication module, a trusted authentication module, a multi-dimensional state panoramic perception module, a data analysis and system identification module, and an intelligent aquafarm operation and maintenance module. FIG. 7 shows a flow block diagram of system modules. The multi-dimensional state panoramic perception module includes an aquafarm water quality environment perception sensor, an aquafarm atmospheric environment perception sensor, and an aquafarm electrical device perception system. All environmental information and electrical device information acquired by the perception modules are transmitted through the multi-mode hybrid networking communication module. The multi-mode hybrid networking communication module includes HPLC communication and LTE radio communication. It may not only perform single communication networking, but also may perform dual-mode hybrid networking, so as to improve a fitness degree with an actual application scenario. The data analysis and system identification module depends on the edge computing terminal, and performs fuzzy data correlation analysis and system identification on acquired data with the statistical analysis, the fuzzy clustering, and the time series analysis. The trusted authentication module introduces an identity authentication function on the IoT cloud platform to ensure information security of device data. With the perception sensor devices, the edge computing terminal, the IoT platform, the intelligent operation and maintenance monitoring and the like, the intelligent aquafarm operation and maintenance module realizes full coverage and full monitoring of an aquaculture IoT for the aquafarm, thereby achieving intelligent operation and maintenance on the aquafarm.

Figure 8:
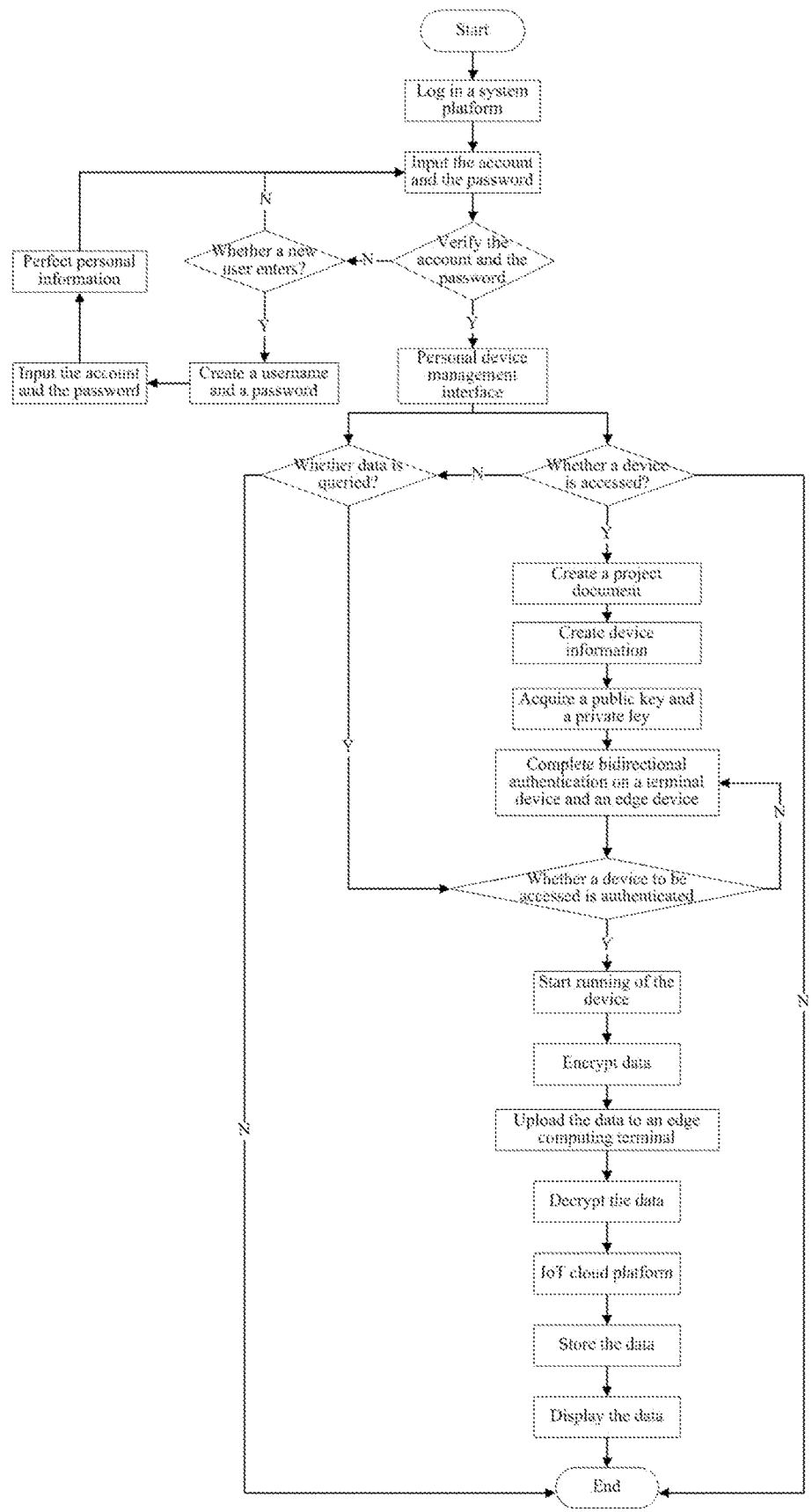
FIG. 8 is a flowchart of trusted authentication according to the present disclosure.

Further, any user cannot access a terminal device or query data unless passing through a trusted authentication process. Referring to FIG. 8, the specific trusted authentication process is as follows:

1) The user must enter a system platform through a third-party application to log in a page for identity (ID) registration, create corresponding username and password, and bind personal information such as an ID card and a cell-phone number.
2) The user logs in the page upon successful creation. After both the account and the password are input and verified successfully, the user can enter a personal device management interface. On the personal device management interface, the user creates a project and a device as required, fills basic information of the project and the device, and follows directions to complete bidirectional authentication on the terminal device and the edge device.
3) The user installs security protocol development firmware of the system as required, and acquires public and private keys from a third-party key generation center. The edge gateway stores the public and private keys to a memory secretly. During acquisition and encryption of the keys, the keys do not occur in a plaintext, for sake of secure encryption.

4) When running, a device to be accessed checks whether it is authenticated. If no, the device sends an ID authentication request to the edge computing terminal. Upon reception of the authentication request, the edge computing terminal performs ID authentication through the ID authentication module and the terminal.
5) Upon successful authentication, the intelligent gateway uses a conference key generated by a key agreement protocol to encrypt data acquired by the sensor devices, and uploads data to the edge computing terminal.
6) Upon reception of a ciphertext, the edge computing terminal decrypts the ciphertext, extracts key data therein, encapsulates data according to a message format defined in the system, and transmits the data to the IoT cloud platform through the HTTP protocol.
7) The IoT cloud platform analyzes a message and stores data to a corresponding database, such that the user queries the acquired data of the sensor devices in real time.

The present disclosure achieves the following beneficial effects over the conventional aquafarm: (1) The present disclosure proposes a trusted power communication technique with HPLC and LTE dual-mode networking in the complicated aquafarm environment, which makes fusion between the power grid and the aquafarm more possible, and avoids a high cost caused by repeated wiring. (2) The present disclosure realizes intelligent perception of multi-dimensional information on the water quality, the atmospheric environment and the electrical devices, and solves the problem of the low digital monitoring level for information on the water quality, the atmospheric environment and the electrical devices. (3) With the correlation and coupling mechanism between the data on the water quality, the atmospheric environment and the electrical devices, the present disclosure solves the problems of the low intelligent control level for the electrical devices, the high energy consumption, and the low level of risk prevention. (4) In combination with the water quality information and the electrical device information, the present disclosure constructs the multi-source information electrical device fault diagnosis model with the multi-source information fusion to realize real-time state perception and efficient fault diagnosis of the electrical devices. (5) The present disclosure fuses the aquaculture IoT, big data and other advanced techniques to improve the operation and maintenance efficiencies on the aquafarm. (6) By introducing the trusted authentication, the present disclosure satisfies security requirements on access and data transmission of the electrical devices in the complicated aquafarm environment.

The present disclosure further provides a system for intelligently monitoring an aquafarm with multi-dimensional panoramic perception, including:

a perception information acquisition module configured to acquire multi-dimensional panoramic perception information of an aquafarm with sensors, where the multi-dimensional panoramic perception information includes water quality information, atmospheric environmental information, and electrical device state information in the aquafarm; the water quality information includes an oxygen content, a pH value, a conductivity, a temperature, and a turbidity; the atmospheric environmental information includes a temperature, a humidity, an illumination intensity, and an atmospheric pressure intensity in an atmospheric environment; and the electrical device state information in the aquafarm includes currents, voltages, surface temperatures, and electric powers of electrical devices;

a preprocessing module configured to preprocess the multi-dimensional panoramic perception information with statistical analysis to obtain preprocessed multi-dimensional panoramic perception information;

a feature extraction module configured to perform feature extraction on the preprocessed multi-dimensional panoramic perception information to determine a threshold range of the preprocessed multi-dimensional panoramic perception information;

a time series analysis module configured to analyze the preprocessed multi-dimensional panoramic perception information with time series analysis to obtain a linear fitting model;

a water quality forecasting-alarming model construction module configured to construct a water quality forecasting-alarming model according to the linear fitting model;

a data fusion module configured to fuse preprocessed water quality information and preprocessed electrical device state information to obtain fused data;

a training module configured to input the fused data to a CNN for training to obtain an electrical device fault diagnosis model; and a monitoring module configured to monitor the aquafarm with the water quality forecasting-alarming model and the electrical device fault diagnosis model, and give an alarm in response to a substandard water quality or a fault in each of the electrical devices.

Preferably, the water quality forecasting-alarming model construction module includes:

a clustering unit configured to cluster the preprocessed multi-dimensional panoramic perception information with a fuzzy clustering algorithm according to the linear fitting model to obtain cluster centers;

a model construction unit configured to take the preprocessed multi-dimensional panoramic perception information as a sample set to construct a T-S fuzzy model; and a parameter identification unit configured to identify parameters of the T-S fuzzy model with the cluster centers to obtain the water quality forecasting-alarming model.

According to the specific embodiments provided by the present disclosure, the present disclosure achieves the following technical effects:

The method, system and apparatus for intelligently monitoring an aquafarm with multi-dimensional panoramic perception provided by the present disclosure have the following beneficial effects over the prior art: The present disclosure constructs the water quality forecasting-alarming model with the linear fitting model, fuses the water quality information and the electrical device state information, and trains the fused data to obtain the electrical device fault diagnosis model. In this way, the present disclosure can monitor the aquafarm with the water quality forecasting-alarming module and the electrical device fault diagnosis model, and gives an alarm in response to a substandard water quality or a fault in each of electrical devices, thereby greatly improving operation and maintenance efficiencies of the aquafarm.

Each example of the present specification is described in a progressive manner, each example focuses on the difference from other examples, and the same and similar parts between the examples may refer to each other.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. A method for intelligently monitoring an aquafarm with multi-dimensional panoramic perception, comprising:

acquiring multi-dimensional panoramic perception information of an aquafarm with sensors, wherein the multi-dimensional panoramic perception information comprises water quality information, atmospheric environmental information, and electrical device state information in the aquafarm; the water quality information comprises an oxygen content, a pH value, a conductivity, a temperature, and a turbidity; the atmospheric environmental information comprises a temperature, a humidity, an illumination intensity, and an atmospheric pressure intensity in an atmospheric environment; and the electrical device state information in the aquafarm comprises currents, voltages, surface temperatures, and electric powers of electrical devices;

preprocessing the multi-dimensional panoramic perception information with statistical analysis to obtain preprocessed multi-dimensional panoramic perception information;

performing feature extraction on the preprocessed multi-dimensional panoramic perception information to determine a threshold range of the preprocessed multi-dimensional panoramic perception information;

analyzing the preprocessed multi-dimensional panoramic perception information with time series analysis to obtain a linear fitting model;

constructing a water quality forecasting-alarming model according to the linear fitting model;

fusing preprocessed water quality information and preprocessed electrical device state information to obtain fused data;

inputting the fused data to a convolutional neural network (CNN) for training to obtain an electrical device fault diagnosis model; and monitoring the aquafarm with the water quality forecasting-alarming model and the electrical device fault diagnosis model, and giving an alarm in response to a substandard water quality or a fault in each of the electrical devices; wherein the constructing a water quality forecasting-alarming model according to the linear fitting model comprises:

clustering the preprocessed multi-dimensional panoramic perception information with a fuzzy clustering algorithm according to the linear fitting model to obtain cluster centers;

taking the preprocessed multi-dimensional panoramic perception information as a sample set to construct a Takagi-Sugeno (T-S) fuzzy model; and identifying parameters of the T-S fuzzy model with the cluster centers to obtain the water quality forecasting-alarming model;

wherein a target function of the fuzzy clustering algorithm is given by:

$$J_m(U, V) = \sum_{k=1}^{N}\sum_{i=1}^{c}(u_{ik})^m \|X_k - v_i\|^2 + \alpha\sum_{i=1}^{c}\|v_i^{(0)} - v_i\|^2,$$

wherein, $X_k$ is a kth sample, N is a number of samples, $u_{ik}$ is a degree of membership of the sample $X_k$ to a cluster center $v_i$, m represents a number of clusters, $v_i$ represents an ith cluster center, c represents a number of the cluster centers, $\alpha$ is a regularization parameter, $v_i^{(0)}$ represents a priori estimated value of $v_i$, V is a cluster center matrix, $V=(v_1, v_2, \ldots, v_c)$, and U is a fuzzification matrix.

2. The method for intelligently monitoring an aquafarm with multi-dimensional panoramic perception according to claim 1, wherein the fusing preprocessed water quality information and preprocessed electrical device state information to obtain fused data comprises:

obtaining, according to cross-correlation between homogeneous sensor signals, total correlation energy of any sensor signal with all of the homogeneous sensor signals, wherein the homogeneous sensor signals are the preprocessed water quality information or the preprocessed electrical device state information;

normalizing the correlation energy, and calculating a variance contribution rate of normalized correlation energy; and fusing the homogeneous sensor signals according to the variance contribution rate to obtain the fused data.

3. The method for intelligently monitoring an aquafarm with multi-dimensional panoramic perception according to claim 2, wherein the obtaining, according to cross-correlation between homogeneous sensor signals, total correlation energy of any sensor signal with all of the homogeneous sensor signals comprises:

obtaining the correlation energy by:

$$E_i = \sum_{j=1,j\neq i}^{m} E_{ij} = \sum_{j=1,j\neq i}^{m}\sum_{t=0}^{n-1}[R_{ij}(t)]^2, \text{ and}$$

$$R_{ij}(t) = \frac{1}{n-t}\sum_{t_0=1}^{n-t}x_i(t_0)x_j(t_0+t),$$

wherein, $E_i$ represents correlation energy of an ith sensor, m represents a number of homogeneous sensors, n represents a number of data points acquired by the sensors, $t=0, 1, 2, \ldots, n-1$ represents a time series of the signals, $R_{ij}(t)$ represents the cross-correlation between the homogeneous sensor signals, $x_i(t_0)$ represents a value acquired by the ith sensor at a moment $t_0$, and $x_j(t_0+t)$ represents a value acquired by a jth sensor at a moment $t_0+t$.

4. The method for intelligently monitoring an aquafarm with multi-dimensional panoramic perception according to claim 3, wherein the normalizing the correlation energy, and calculating a variance contribution rate of normalized correlation energy comprises:

obtaining the variance contribution rate by:

$$K_{iI} = \frac{[y_i(I) - \mu_i]^2}{n\sigma_i^2}, \text{ and}$$

$$y_i = \frac{x_i}{\sqrt{E_i^2}},$$

wherein, $K_{iI}$ represents a variance contribution rate of Ith data acquired by the ith sensor, $y_i(I)$ represents an Ith data point of an energy normalization signal $y_i$, $x_i$ represents a data point acquired by the ith sensor, $\mu_i$ represents a mean of the energy normalization signal $y_i$, and $\sigma_i^2$ represents a variance of the energy normalization signal $y_i$.

5. The method for intelligently monitoring an aquafarm with multi-dimensional panoramic perception according to claim 4, wherein the fusing the homogeneous sensor signals according to the variance contribution rate to obtain the fused data comprises:

obtaining, according to the variance contribution rate, a distribution coefficient of each of data points acquired by the sensors, wherein the distribution coefficient is calculated by:

$$k_{iI} = \frac{K_{iI}}{\sum_{i=1}^{m} K_{iI}}, I = 1, 2, \ldots, n,$$

wherein, $K_{iI}$ represents a distribution coefficient of an Ith data point acquired by the ith sensor; and fusing, based on the distribution coefficient, data points acquired by the homogeneous sensors to obtain the fused data.

6. A system for intelligently monitoring an aquafarm with multi-dimensional panoramic perception, comprising:

a perception information acquisition module configured to acquire multi-dimensional panoramic perception information of an aquafarm with sensors, wherein the multi-dimensional panoramic perception information comprises water quality information, atmospheric environmental information, and electrical device state information in the aquafarm; the water quality information comprises an oxygen content, a pH value, a conductivity, a temperature, and a turbidity; the atmospheric environmental information comprises a temperature, a humidity, an illumination intensity, and an atmospheric pressure intensity in an atmospheric environment; and the electrical device state information in the aquafarm comprises currents, voltages, surface temperatures, and electric powers of electrical devices;

a preprocessing module configured to preprocess the multi-dimensional panoramic perception information with statistical analysis to obtain preprocessed multi-dimensional panoramic perception information;

a feature extraction module configured to perform feature extraction on the preprocessed multi-dimensional panoramic perception information to determine a threshold range of the preprocessed multi-dimensional panoramic perception information;

a time series analysis module configured to analyze the preprocessed multi-dimensional panoramic perception information with time series analysis to obtain a linear fitting model;

a water quality forecasting-alarming model construction module configured to construct a water quality forecasting-alarming model according to the linear fitting model;

a data fusion module configured to fuse preprocessed water quality information and preprocessed electrical device state information to obtain fused data;

a training module configured to input the fused data to a convolutional neural network (CNN) for training to obtain an electrical device fault diagnosis model; and a monitoring module configured to monitor the aquafarm with the water quality forecasting-alarming model and the electrical device fault diagnosis model, and give an alarm in response to a substandard water quality or a fault in each of the electrical devices;

wherein the water quality forecasting-alarming model construction module comprises:

a clustering unit configured to cluster the preprocessed multi-dimensional panoramic perception information with a fuzzy clustering algorithm according to the linear fitting model to obtain cluster centers;

a model construction unit configured to take the preprocessed multi-dimensional panoramic perception information as a sample set to construct a Takagi-Sugeno (T-S) fuzzy model; and a parameter identification unit configured to identify parameters of the T-S fuzzy model with the cluster centers to obtain the water quality forecasting-alarming model; and a target function of the fuzzy clustering algorithm is given by:

$$J_m(U, V) = \sum_{k=1}^{N} \sum_{i=1}^{c} (u_{ik})^m \|X_k - v_i\|^2 + \alpha \sum_{i=1}^{c} \|v_i^{(0)} - v_i\|^2,$$

wherein, $X_k$ is a kth sample, N is a number of samples, $u_{ik}$ is a degree of membership of the sample $X_k$ to a cluster center $v_i$, m represents a number of clusters, $v_i$ represents an ith cluster center, c represents a number of the cluster centers, $\alpha$ is a regularization parameter, $v_i^{(0)}$ represents a priori estimated value of $v_i$, V is a cluster center matrix, $V=(v_1, v_2, \ldots, v_c)$, and U is a fuzzification matrix.

7. An apparatus for intelligently monitoring an aquafarm with multi-dimensional panoramic perception, comprising:

a multi-parameter water quality sensor module configured to acquire water quality information of an aquafarm;

a meteorological sensor module configured to acquire atmospheric environmental information;

an aquafarm device monitoring module configured to acquire electrical device state information in the aquafarm, the water quality information, the atmospheric environmental information and the electrical device state information in a fishing ground forming multi-dimensional state panoramic perception information;

an intelligent gateway in communication connection with the multi-parameter water quality sensor module, the meteorological sensor module, and the aquafarm device monitoring module; and an edge computing terminal provided thereon with a high-speed power line carrier (HPLC) communication router and a long term evolution (LTE) communication router, wherein both the HPLC communication router and the LTE communication router are in communication connection with the intelligent gateway; and the edge computing terminal is configured to monitor the aquafarm according to the water quality information, the atmospheric environmental information and the electrical device state information, and give an alarm in response to a substandard water quality or a fault in each of electrical devices;

wherein the edge computing terminal is specifically configured to:

preprocess the multi-dimensional panoramic perception information with statistical analysis to obtain preprocessed multi-dimensional panoramic perception information;

perform feature extraction on the preprocessed multi-dimensional panoramic perception information to determine a threshold range of the preprocessed multi-dimensional panoramic perception information;

analyze the preprocessed multi-dimensional panoramic perception information with time series analysis to obtain a linear fitting model;

construct a water quality forecasting-alarming model according to the linear fitting model;

fuse preprocessed water quality information and preprocessed electrical device state information to obtain fused data;

input the fused data to a convolutional neural network (CNN) for training to obtain an electrical device fault diagnosis model; and monitor the aquafarm with the water quality forecasting-alarming model and the electrical device fault diagnosis model, and give the alarm in response to the substandard water quality or the fault in each of the electrical devices;

constructing the water quality forecasting-alarming model according to the linear fitting model comprises:

clustering the preprocessed multi-dimensional panoramic perception information with a fuzzy clustering algorithm according to the linear fitting model to obtain cluster centers;

taking the preprocessed multi-dimensional panoramic perception information as a sample set to construct a Takagi-Sugeno (T-S) fuzzy model; and identifying parameters of the T-S fuzzy model with the cluster centers to obtain the water quality forecasting-alarming model; and a target function of the fuzzy clustering algorithm is given by:

$$J_m(U, V) = \sum_{k=1}^{N}\sum_{i=1}^{c}(u_{ik})^m\|X_k - v_i\|^2 + \alpha\sum_{i=1}^{c}\|v_i^{(0)} - v_i\|^2,$$

wherein, $X_k$ is a kth sample, N is a number of samples, $u_{ik}$ is a degree of membership of the sample $X_k$ to a cluster center $v_i$, m represents a number of clusters, $v_i$ represents an ith cluster center, c represents a number of the cluster centers, $\alpha$ is a regularization parameter, $v_i^{(0)}$ represents a priori estimated value of $v_i$, V is a cluster center matrix, $V=(v_1, v_2, \ldots, v_c)$, and U is a fuzzification matrix.

* * * * *